United States Patent [19]

Ruesch et al.

[11] 4,331,912

[45] May 25, 1982

[54] CIRCUIT FOR CONVERTING A NON-LIVE ZERO CURRENT SIGNAL TO A LIVE ZERO DC OUTPUT SIGNAL

[75] Inventors: James R. Ruesch, Boulder, Colo.; Charles E. Goetzinger, Bloomington, Minn.

[73] Assignee: Rosemount Inc., Eden Prairie, Minn.

[21] Appl. No.: 194,083

[22] Filed: Oct. 6, 1980

[51] Int. Cl.³ .............................................. G05F 1/46
[52] U.S. Cl. ................................... 323/271; 323/281; 363/21
[58] Field of Search ............... 323/268, 270, 271, 272, 323/275, 280, 281, 285; 363/18-21, 97, 131

[56] References Cited

U.S. PATENT DOCUMENTS

| | | | |
|---|---|---|---|
| 3,646,538 | 2/1972 | Frick | 340/200 |
| 3,675,122 | 7/1972 | Rose | 324/62 |
| 3,697,862 | 10/1972 | Taylor | 323/268 |
| 3,717,858 | 2/1973 | Hadden | 323/224 X |
| 3,735,242 | 5/1973 | Andersen | 323/280 |
| 3,764,880 | 10/1973 | Rose | 363/22 |
| 3,854,039 | 12/1974 | Serrano | 235/193.5 |
| 3,864,623 | 2/1975 | Luce | 323/280 |
| 3,906,338 | 9/1975 | Grindheim | 323/293 |
| 3,975,719 | 8/1976 | Frick | 340/200 |
| 4,205,327 | 5/1980 | Dahlke | 340/208 |
| 4,206,397 | 6/1980 | Dahlke | 323/273 |
| 4,264,896 | 4/1981 | Sakarya et al. | 323/299 X |

*Primary Examiner*—William M. Shoop
*Assistant Examiner*—Peter S. Wong
*Attorney, Agent, or Firm*—Kinney, Lange, Braddock, Westman and Fairbairn

[57] ABSTRACT

A circuit is coupled to an external power supply and is coupled to a non-live zero, two wire DC current transmitter (e.g. 4-20 MA output) for converting such current to a live-zero DC output current signal (e.g. 0-20 MA output) and for powering such transmitter. The circuit has a first current to voltage converter for converting the transmitter current signal to a voltage signal, and a second current to voltage converter coupled to receive the circuit output current signal and an offset current from an offset current source for converting the sum of the circuit output and offset currents to a second voltage signal. A comparator is used for comparing the first and second voltage signals to provide the live-zero output current signal representative of the non-live zero transmitter signal. The circuitry can also provide isolated power to the transmitter and feedback (closed loop) control of such power.

13 Claims, 1 Drawing Figure

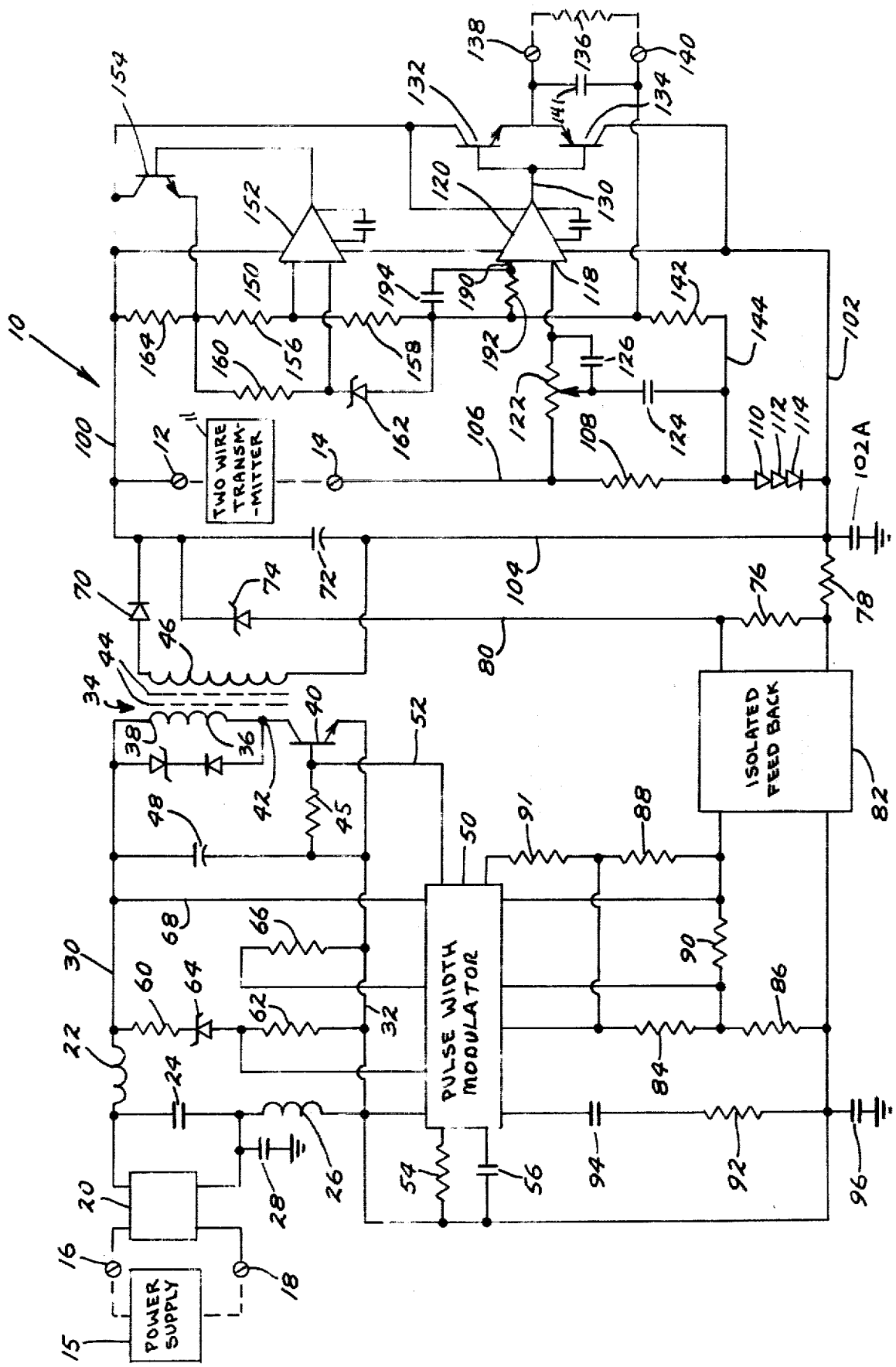

CIRCUIT FOR CONVERTING A NON-LIVE ZERO CURRENT SIGNAL TO A LIVE ZERO DC OUTPUT SIGNAL

BACKGROUND OF THE INVENTION

1. Field of the Invention

This invention relates to two wire DC transmitters and more particularly to a means for converting the output thereof from a non-live current signal, such as 10-50 MA (milliamperes), 4-20 MA or the like to a live zero output current such as 0-50 MA, 0-20 MA, etc.

2. Prior Art

In the prior art there are two, three and and four wire DC current transmitters. Typically, in the four wire transmitters power is provided along two wires and a DC current signal representative of a parameter along a second pair of wires. The three wire transmitter is quite similar to a four wire transmitter but operates on three wires as the power supply to the transmitter and the current signal share a common lead. Such three and four wire transmitters are useful and generally function reliably.

More recently two wire DC current transmitters have gained considerably acceptance. Such acceptance is due to the fact that power is provided to the transmitter from an external source along the same two wires through which the two wire transmitter provides a DC current representative of a parameter to an external load. One problem is that the two wire transmitter typically provides a base current elevated above zero (a non-live zero current) representative of a zero or reference level of such parameter. The two wire transmitter consumes the current from zero current to such base current internally such as 0-10 MA or 0-4 MA. While the majority of new uses for transmitters seems to be for two wire transmitters, certain existent facilities and new projects require the live zero output current signal. In the prior art, the choice for such live zero applications has been the three or four wire transmitters or, perhaps, an expensive, often custom engineered conversion of a two wire signal to a live zero output signal. Briefly, a "live zero" can be thought of as a system where any current different from zero indicates a parameter value.

SUMMARY OF THE INVENTION

The present invention provides an inexpensive means for converting a two wire transmitter having a non-live zero, DC current output signal to a live zero DC current output signal. Such conversion permits a two wire transmitter of standard design to be used in facilities where such live zero output signal is desired. The invention further provides electrical isolation of the external power supply from the transmitter and converting electronics and may, as desired, include feedback control, also including electrical isolation as desired, of such power. The circuitry comprises first and second conversion means for the two wire current signal and for the output current signal and an offset current which may be combined with either signal to provide the live zero current output signal. The circuitry in a rather simple manner solves the long term problem of applying known two wire transmitters to live zero applications in an inexpensive, convenient, standard manner. This invention thus enables two wire transmitter manufacturers to reach the markets of three and four wire transmitters in a competitive manner, and permits a user of three and four wire transmitters having a live zero system to use both the existent three and four wire technology and the new technology of two wire transmitters in his information system in a convenient manner.

BRIEF DESCRIPTION OF THE DRAWING

The FIGURE is an electrical schematic representation of a preferred embodiment of the present invention.

DESCRIPTION OF THE PREFERRED EMBODIMENT

One embodiment of a circuit for converting a DC non-live zero, current from a two wire transmitter to a live zero output in accord with the present invention is shown generally at 10. Such DC two wire transmitter may have circuitry, for example, in accord with U.S. Pat. Nos. 3,646,538, 3,764,880, 4,205,327, 4,206,397, 3,906,338, 3,675,122, 3,975,719 and 3,854,039, but the output of other two wire transmitters can also be converted to a live zero output signal by this invention. Again, by means of one example, the two wire circuit of U.S. Pat. No. 3,646,538 to Frick preferably is coupled to the embodiment of the figure by connecting the positive terminal shown in U.S. Pat. No. 3,646,538 to terminal 12 in the present drawings, and the negative terminal 62 shown in U.S. Pat. No. 3,646,538 to terminal 14. The circuit according to the invention, then provides power to the two wire transmitter 11 and converts the output DC current therefrom to a live zero output DC current as explained herein.

An external power supply 15 which may be an alternating (AC) or a direct current (DC) supply is connected to terminals 16 and 18. Terminals 16 and 18 are coupled to a full wave rectifier 20, which in turn is coupled to a electro-magnetic interference filter (EMI) comprising an inductor 22, a capacitor 24 and an inductor 26. A filter capacitor 28 for further filtering is provided between capacitor 24 and inductor 26 to ground. When supply 15 is active, a filtered DC voltage is impressed between a line 30 and a line 32.

Such filtered DC voltage is coupled to a transformer 34 which has a primary winding 36 connected to line 30 at a first end 38, and to line 32 through the collector-emitter junction of a transistor 40 at a second end 42. Primary winding 36 of transformer 34 is coupled (as shown at 44) to a secondary winding 46 to provide an isolated voltage thereto. The transistor 40 is coupled through a resistor 45 to line 32 for bias. A capacitor 48 is coupled to line 30 and to line 32 for filtering.

A pulse width modulator 50 provides a control signal to the base of transistor 40 along a line 52. In one preferred embodiment, pulse width modulator 50 is Model No. SG1524 manufactured by Signetics of Sunnyvale, Calif. Pulse width modulator 50 has a fixed rate output pulse determined by the value of a resistor 54 and a capacitor 56. In one preferred embodiment, resistor 54 is 4.7 kilohms (K$\Omega$) and capacitor 56 is 0.0022 microfarads ($\mu$f), hence, providing a 50 kilohertz (KHZ) output pulse rate. Resistors 60 and 62 and a diode 64 are coupled to lines 30 and 32 and to pulse width modulator 50 to form a DC sense line which in cooperation with a resistor 66 from line 32 sense the DC voltage between lines 30 and 32 and such sensing network in cooperation with pulse width modulator 50 inhibits the output signal from modulator 50 when the voltage between lines 30 and 32 is below a predetermined (nominal) level. A line 68 is coupled to line 30 and to pulse width modulator 50 and line 32 is also coupled to pulse width modulator to provide power thereto.

The voltage in secondary winding 46 of choke 34 affects an output diode 70 and the transferred energy flows into an output capacitor 72 and the subsequent circuitry which comprises the load. Such voltage affects diode 74, a current limiting resistor 76 and a resistor 78 causing a current therethrough. Current in a line 80 which couples diode 74 to resistor 76 is dependent on the characteristics of diode 74, and the value of resistance of resistor 76 and the voltage applied thereto. In one embodiment is a IN5257B diode 74 and resistor 76 is 1 kiloohm. The current path from diode 74 and resistors 76 and 78 is primarily completed through an isolated feedback device 82, which in one embodiment is a photo coupler, and preferably is a model 4N28 manufactured by Motorola Inc, of Schaumburg, Illinois. Isolated feedback device 82 then couples a signal representative of such current from the secondary side of transformer 34 (line 80) to the primary side thereof, by a light coupling means, thus providing electrical isolation between the primary and secondary sides of transformer 34. Resistors 84, 86 and 88 together with the output of isolated feedback device 82 form a bridge which is loaded by a resistor 90 and such bridge provides a differential voltage to pulse width modulator 50, which then controls the pulse width of the signal therefrom along line 52 responsive to such differential voltage. A resistor 91 is coupled through pulse width modulator 50 and serves as the pull up resistor for transistor 40. A resistor 92 and a capacitor 94 are coupled to line 32 to provide compensation for stability and compensation for overshoot by adjusting the phase-gain relationships of the circuit. A capacitor 96 provides EMI filtering.

The voltage supplied from second winding 46 to diode 74 is rectified by diode 70 and stored by capacitor 72, thus establishing a DC voltage between lines 100 and 102 to power the two wire transmitter 11 through terminals 12 and 14 and also to power the subsequent circuitry. A capacitor 102A couples line 102 to ground for EMI filtering. The DC current is controlled by the two wire transmitter responsive to a desired parameter. The DC current from the transmitter 11 may vary between 10-50 milliamperes (MA) or 4-20 MA or other selected values. The DC current from the transmitter then flows into the present circuit at terminal 14 and is fed through a line 106, a resistor 108 and three diodes 110, 112 and 114 to line 102 which is the negative supply line. In one preferred embodiment, when the two wire transmitter current ($I_{TWT}$) is 4-20 MA, resistor 108 preferably is a 250 ohm precision resistor. A 1 to 5 volt signal is developed across resistor 108. This voltage signal is then applied to a first input terminal 118 of a comparison amplifier 120. A variable resistor 122 and a capacitor 124 adjustably determine the circuit time constant, while a capacitor 126 provides further EMI filtering. In control, comparison amplifier 120 provides a control signal along a line 130 to the bases of a pair of current control transistors 132, 134 which control the current to an external load 136, which is connected to the present circuitry by terminals 138 and 140. A capacitor 141 provides EMI filtering. Current for external load 136 ($I_{LOAD\ CURRENT}$) may flow from line 100 through current control transistor 132 and through current resistors 136 and 142 to diodes 110, 112 and 114 and to line 102. Diodes 110, 112 and 114 hold the voltage on line 144 an aggregate of the voltage drops of such diodes above line 102. Hence, current may flow in the opposite direction through load 136 from current source 150 through resistor 136 and through transistor 134 to line 102. Such directional current through resistor 136 is determined by the output of comparison amplifier 120. In one embodiment when the output of amplifier 120 is positive, transistor 132 is active and current through load 136 is in a positive direction and when the output of amplifier 120 is negative, transistor 134 is active and current through load 136 is in a negative direction.

An offset current is also fed through resistor 142. The offset current is developed by a current source shown at 150. A control amplifier 152 provides a control signal to the base of a current source transistor 154. Transistor 154 is coupled at its collector to line 100 and at its emitter to a bridge comprising resistors 156, 158 and 160 and a Zener diode 162. Amplifier 152 controls the current through the collector-emitter junction of transistor 154 so that the voltage at the inputs of amplifier 152, that is, between resistors 156 and 158, and at the cathode of Zener diode 162 are equal. The voltage between resistors 156 and 158 will vary with different current flow through resistor 142. This changes the control signal from amplifier 152 which changes the current from transistor 154 causing a change in current through the bridge until the voltage levels at the amplifier inputs reach equilibrium. The current through diode 162 and the current through resistors 156, 158 combine to provide the offset current ($I_{offset}$) in resistor 142. A start up resistor 164 provides start up current for current source 150.

An offset current of opposite polarity may be similarly developed and fed through resistor 108 instead of resistor 142 to attain a similar result. In such an instance the offset current is effectively combined with the current from the transmitter 11 and the voltage is compared with the voltage developed at resistor 142 from the circuit output current.

OPERATION OF THE PREFERRED EMBODIMENT

In operation of the circuit 10, a suitable, external AC or DC power supply 15 is coupled to terminals 16 and 18. The supply voltage, if AC, is then rectified by rectifier 20 and the supply voltage is then filtered. This filtered, DC voltage is then applied to the primary winding of transformer 34 which, preferably operates as a flyback transformer, and is switched at a desired frequency by transistor 40. When transistor 40 is conducting, the DC voltage between lines 30 and 32 is impressed across primary winding 36. This voltage cuts off output diode 70. Current in primary winding 36 continues to rise, thus storing energy until transistor 40 is cut off.

At this point the voltage across primary winding 36 reverses, and the stored energy is magnetically transferred to secondary winding 46 thus forward biasing diode 70 to charge output capacitor 72 and thus establishing the desired isolated, DC voltage between lines 100 and 102.

Closed loop control of such isolated DC voltage is accomplished through isolated feedback device 82 providing a feedback signal to pulse width modulator 50. The width of the pulse width signal to the base of transistor 40 is controlled in response to such isolated feedback signal. In the preferred embodiment of the FIGURE, negative feedback is employed, that is, as the voltage between line 100 and 102 increases, the pulse width is decreased, thereby reducing the magnetizing time and resultant energy transfer from primary winding 36 to secondary winding 46.

The voltage from line 100 to line 102 less the diode voltage drops of diodes 110, 112 and 114 and less the voltage drop across resistor 108 is then applied to the two wire transmitter. The two wire transmitter preferably controls a DC output current, representative of a parameter or condition and such DC output current flows through resistor 108, diodes 110, 112 and 114 to line 102 and to secondary winding 46, which completes the circuit. The voltage thus established across resistor 108 is applied to a first input terminal 118 of comparator amplifier 120. As explained, comparator amplifier 120 outputs a control signal on line 130 for transistors 132 and 134 as a function of the signals at both of its inputs.

Positive directed load or circuit output current flows from line 100 through transistor 132 to terminal 138, through external load resistor 136, terminal 140, resistor 142, diodes 110, 112 and 114 and to secondary winding 46 completing the circuit. Negative directed load current flows from current source 150 through terminal 140, load resistor 136, terminal 138, and transistor 134 to line 102 and to secondary winding 46. Such positive or negative directed load or output current combines with the offset current from current control 150 through resistor 142, and the voltage developed by the combined current flowing through resistor 142 is applied at a second input terminal 190 of comparator amplifier 120, across a resistor 192 and an EMI filter capacitor 194. In control, comparator amplifier 120 controls transistor 132 or 134 so that the positive or negative directed circuit output current (load current) across load 136 is a zero based DC current representative of the current from the two wire transmitter. The control equation for the circuit is:

$$(I_{offset} + I_{load\ current}) R_{142} = (I_{TWT}) R_{108}$$

Where:

$I_{offset}$ = offset current from current source 150.

$I_{load\ current}$ = positive or negative directed current through resistor 136 as controlled by comparator amplifier 120.

$R_{142}$ = resistance value of resistor 142.

$I_{TWT}$ = output current representative of a parameter from the two wire transmitter.

$R_{108}$ = resistance value of resistor 108.

Hence, where the two wire transmitter provides a 4–20 MA current responsive to a condition, this circuitry converts such 4–20 MA signal to a live zero 0–20 MA circuit output current signal across a load such as load resistor 136.

Due to the relatively simple design and the minimum number of components in circuitry 10 described herein, in one embodiment the entire circuitry may be mounted in the existent housing for such a two wire transmitter such as a transmitter in accord with U.S. Pat. No. 3,646,538, hence, converting such transmitter to such new use easily and inexpensively.

While the instant invention has been described by reference to several preferred embodiments, those skilled in the art recognize that changes in form and detail may be made without departing from the spirit or scope of the invention.

What is claimed is:

1. Apparatus coupled to an external power supply and coupled to a two wire DC current transmitter providing a transmitter circuit current signal ranging between a base value and a normal maximum value, for converting such signal to a DC circuit output current signal coupled through an external load wherein a zero DC circuit output current is equivalent to the base value and having:

first current-to-voltage conversion means coupled to the transmitter for receiving the transmitter circuit current signal therefrom and for converting said transmitter circuit current signal to a first DC voltage signals as a function of said transmitter circuit current signal;

second current-to-voltage conversion means coupled to receive the DC circuit output current for converting said DC circuit output current to a second DC voltage signal as a function of said DC circuit output current;

current source means providing an offset current;

means to connect the current source means with one of the current-to-voltage conversion means, whereby the DC voltage signal of the one conversion means is affected by the offset current; and p1 means for controlling the DC circuit output current responsive to the first and second DC voltage signals.

2. Apparatus according to claim 1 wherein said means for controlling includes comparator means providing a control signal as a function of the first and second voltage signals.

3. Apparatus according to claim 1 wherein the means to connect the current source means connects the current source means to the second current-to-voltage conversion means.

4. Apparatus according to claim 1 further comprising isolator means coupled between the external power supply and the two wire transmitter for providing electrical isolation therebetween and for powering the transmitter.

5. Apparatus according to claim 4 wherein the isolator means further comprises a flyback transformer means having a primary winding coupled to the power supply and having a secondary winding coupled to the transmitter for transferring electrically isolated energy from the power supply to the transmitter.

6. Apparatus according to claim 5 wherein the isolator means further comprises control means coupled to the primary winding of the transformer means for controlling the amount of energy transferred by the transformer means.

7. Apparatus according to claim 6 wherein the isolation means further comprises feedback means coupled from the secondary winding of the transformer means to the control means for providing a feedback signal to the control means for closed loop control of the energy transfer.

8. Apparatus according to claim 7 wherein the feedback means further provides electrical isolation.

9. Apparatus according to claim 8 wherein the feedback means is a light sensitive coupler.

10. Apparatus according to claim 7 wherein the control means further comprises a transistor coupled to the primary winding and a pulse width modulator means coupled to the transistor to control the rate of energy transfer.

11. Apparatus according to claim 10 wherein the control means further comprises bridge means coupled to the pulse width means and coupled to the feedback means for providing a control signal to the pulse width means responsive to the feedback means.

12. Apparatus according to claim 1 wherein said current source comprises a control amplifier, said means connecting the current source to one current-to-voltage conversion means including a bridge circuit connected so that changes in current through the one current-to-voltage conversion means and the offset current both affect the bridge voltage and said control amplifier controlling the offset current as a function of bridge voltage.

13. Apparatus according to claim 12 wherein one arm of the bridge circuit includes a voltage reference element establishing bridge voltage reference.

* * * * *